United States Patent
Sako

(10) Patent No.: US 8,670,139 B2
(45) Date of Patent: Mar. 11, 2014

(54) PRINTING DEVICE FOR TRANSMITTING PRINT AUTHENTICATION TOKEN AND ELECTRONIC MAIL ADDRESS IN RESPONSE TO A REQUEST

(71) Applicant: Canon Kabushiki Kaisha, Tokyo (JP)

(72) Inventor: Ritsuto Sako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/652,063

(22) Filed: Oct. 15, 2012

(65) Prior Publication Data

US 2013/0094048 A1    Apr. 18, 2013

(51) Int. Cl.
    *G06K 15/00*    (2006.01)
    *G06F 3/12*     (2006.01)
(52) U.S. Cl.
    USPC ........................................ 358/1.14; 358/1.15
(58) Field of Classification Search
    USPC .............................................. 358/1.14, 1.15
    See application file for complete search history.

(56) References Cited

FOREIGN PATENT DOCUMENTS

| JP | 2002-132638 A | 5/2002 |
|----|---------------|--------|
| JP | 2007-112063 A | 5/2007 |
| JP | 2007-265392 A | 10/2007 |
| JP | 2011-198017 A | 10/2011 |

*Primary Examiner* — Eric A Rust
(74) *Attorney, Agent, or Firm* — Canon USA Inc. IP Division

(57) ABSTRACT

In a system in which printing is performed by attaching electronic data to an electronic mail and transmitting the electronic mail to a printing device, the system includes a terminal, a printing device, and a server. The terminal includes a search-request transmitting unit to transmit a printing-service search request to a network. The printing device includes a search-response transmitting unit to transmit a printing-service search response including an authentication token in a case where the printing device has received the printing-service search request. The terminal further includes a mail transmitting unit to, in the case of transmission of print data using an electronic mail, also transmit an authentication token. The printing device further includes a determining unit to determine whether the authentication token transmitted by the terminal and the authentication token that the printing device holds match, and give, in accordance with a result of the determination, permission for printing.

13 Claims, 15 Drawing Sheets

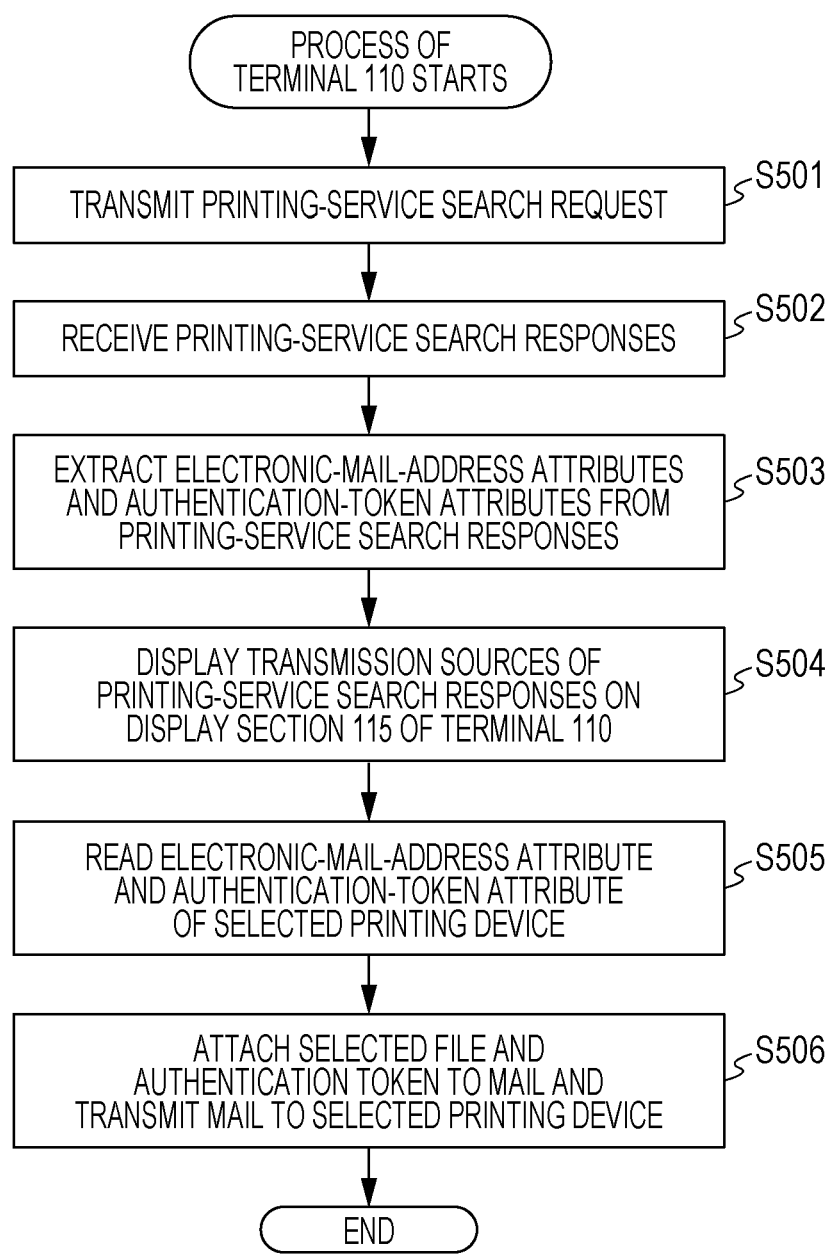

| ATTRIBUTE | VALUE |
|---|---|
| Pdl | JPEG, TIFF |
| Color | True |
| Duplex | False |
| EmailAddress | printer_kaihatsu1@xxxxx.jp |
| AuthToken | 281868ec-f797-425f-b1c1-7b03c264 |

| TIME OF ISSUE | PERIOD OF VALIDITY | VALUE OF AUTHENTICATION TOKEN |
|---|---|---|
| 2011/5/23 8:00 | 2011/5/23 9:00 | 281868ec-f797-425f-b1c1-7b03c264 |
| 2011/5/23 8:30 | 2011/5/23 9:30 | 3829722a-658492fff-3422-9468-329 |
| 2011/5/23 9:00 | 2011/5/23 10:00 | 49385233-658492fff-3422-9468-329 |

1501
1502
1503

PRINTING DEVICE FOR TRANSMITTING PRINT AUTHENTICATION TOKEN AND ELECTRONIC MAIL ADDRESS IN RESPONSE TO A REQUEST

BACKGROUND OF THE INVENTION

1. Field of the Invention

The claimed invention generally relates to printing and, more particularly, to a printing system and a printing device that print an image based on a file attached to an electronic mail.

2. Description of the Related Art

In recent years, a system is known, in which a personal computer (PC), a mobile terminal, or the like transmits an electronic mail including an attached file to an electronic-mail address of a printing device, whereby the attached file is printed by the printing device (see Japanese Patent Laid-Open No. 2002-132638).

In this case, the transmission terminal transmits an electronic mail to the electronic-mail address of the printing device in a state in which an electronic file that is a print target is attached to the electronic mail. A print-document management server having a mail server function extracts the electronic file attached to the electronic mail whose destination is the electronic-mail address assigned to the printing device, and stores the electronic file. Then, the print-document management server converts the stored electronic file into an image format in which the specified printing device can perform printing. The printing device regularly inquires of the print-document management server whether print data whose destination is the subject device is present. In the case where the printing device has detected that print data whose destination is the subject device is present in the print-document management server, the printing device obtains the print data, and performs printing.

In the above-mentioned printing system, once leakage of the electronic-mail address of the printing device occurs, there is a probability that the printing device will come under attack such as transmission of a large number of electronic files from an unauthorized user. There is a security problem.

For this reason, a mechanism is desired which gives permission for printing or rejects printing in some manner without unconditionally giving permission to print the electronic file transmitted to the electronic-mail address of the printing device.

In the view of the above-mentioned problem, a goal of the claimed invention is to provide an authentication printing system that is a printing system which prints an image based on a file attached to an electronic mail, and that is capable of preferably giving permission for printing and rejecting printing.

SUMMARY OF THE INVENTION

In order to achieve the above-mentioned goal, a printing system according to an aspect of the claimed invention is a printing system including a terminal that, by transmitting an electronic mail including an electronic file, makes a request to print the electronic file, and a printing device that prints an image based on an electronic file included in an electronic mail, the terminal and the printing device being connected to each other via a network. The terminal includes the following: a search-request transmitting unit configured to, in a case of performing printing of an electronic file, transmit a search request to search for a printing device to the network; a search-response receiving unit configured to receive an electronic-mail address and an authentication token of a printing device as a response to the search request transmitted by the search-request transmitting unit; and a mail transmitting unit configured to transmit an electronic mail including the authentication token, which has been received by the search-response receiving unit, and the electronic file to the electronic-mail address, which has been received by the search-response receiving unit. The printing device includes the following: a holding unit configured to hold an authentication token; a search-request receiving unit configured to receive a search request to search for a printing device from the network; a search-response transmitting unit configured to transmit, in a case where the search request has been received by the search-request receiving unit, to a device that is a transmission source of the search request, a search response including the authentication token which is held by the holding unit and an electronic-mail address that is assigned to the printing device; a mail receiving unit configured to receive an electronic mail including an electronic file; and a printing unit configured to, in a case where the authentication token that the printing device has issued is included in the electronic mail received by the mail receiving unit, perform printing of the electronic file included in the received electronic mail.

Furthermore, a printing device according to another aspect of the claimed invention includes the following: a holding unit configured to hold an authentication token; a search-request receiving unit configured to receive a search request to search for a printing device from a network; a search-response transmitting unit configured to transmit, in a case where the search request has been received by the search-request receiving unit, to a device that is a transmission source of the search request, a search response including the authentication token of the holding unit and an electronic-mail address that is assigned to the printing device; a mail receiving unit configured to receive an electronic mail including an electronic file; and a printing unit configured to, in a case where the authentication token that the printing device has issued is included in the electronic mail received by the mail receiving unit, perform printing of the received electronic mail.

Further features of the claimed invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the claimed invention and, together with the description, serve to explain the principles of the claimed invention.

FIG. 5 is a flowchart illustrating a process performed in the terminal 110.

FIG. 15 is a diagram illustrating authentication tokens that are held by the printing device 140 in a fourth embodiment.

DESCRIPTION OF THE EMBODIMENTS

Various exemplary embodiments, features, and aspects of the claimed invention will be described in detail below with reference to the drawings.

First Embodiment

Figure 1:
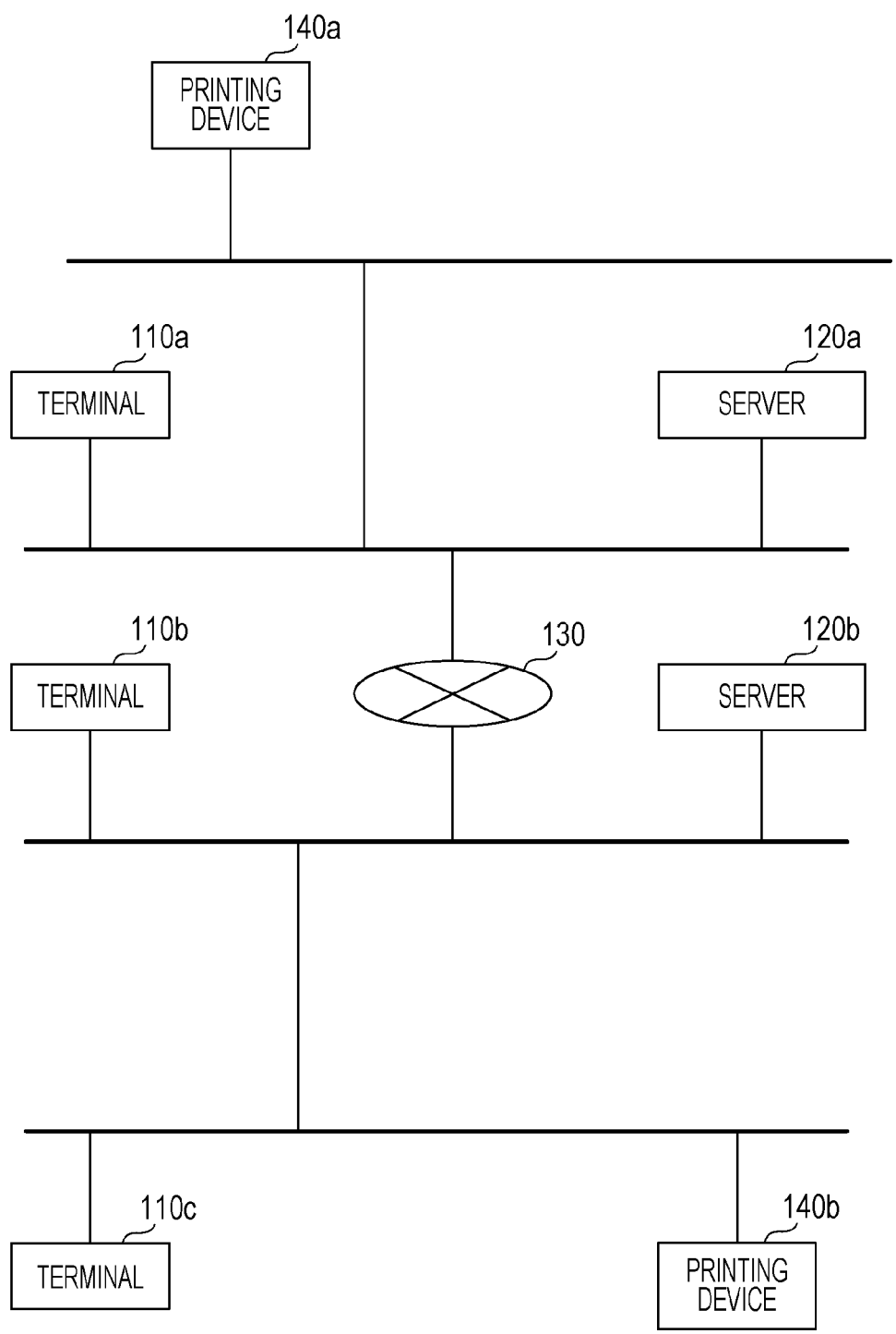
FIG. 1 is a block diagram illustrating an example of a configuration of a printing system, which includes terminals, servers, and printing devices, according to a present embodiment.

FIG. 1 is a block diagram illustrating an example of a configuration of a printing system according to a present embodiment.

In the example of the printing system illustrated in FIG. 1, a plurality of terminals 110a to 110c, and a plurality of servers 120a and 120b, and a plurality of printing devices 140a and 140b are connected to networks. The terminals 110a to 110c are terminals having a function of transmitting/receiving an electronic mail, and are, for example, personal computers or mobile terminals. The servers 120a and 120b are document management servers having a mail-server function of managing electronic mails or a function of converting a file attached to a mail into a format in which the server is capable of performing printing and of transmitting the file to a printing device. The printing devices 140a to 140c are devices having a function of obtaining data from the servers 120 and printing the data, and are, for example, digital multifunction machines for office use or inkjet printers for home use.

The terminal 110a can communicate with the server 120a using an electronic-mail protocol. Similarly, the terminals 110b and 110c can communicate with the server 120b using the electronic-mail protocol.

Furthermore, the terminals 110a to 110c can communicate, via the server 120a and a wide area network (WAN) 130, with terminals that are provided in other networks.

Moreover, each of the terminals 110a to 110c can search, using multicasting, for printing devices that are provided in the same sub-network which is set by a router that is not illustrated.

Note that, in the description given below, as long as the terminals 110a to 110c are not particularly distinguished from each other, the terminals 110a to 110c are simply referred to as terminals 110. Likewise, the servers 120a and 120b are also, similarly, referred to as servers 120, and the printing devices 140a and 140b are also referred to as printing devices 140.

Additionally, FIG. 1 is a diagram for explaining an example of the printing system according to the present embodiment. Communication between the terminals 110 and the servers 120, communication between the terminals 110 and the printing devices 140, and communication between the servers 120 and the printing devices 140 may be communication via a local area network (LAN) or WAN, or may be communication through one or a plurality of servers, such as servers of mobile-phone base stations.

Next, a hardware configuration diagram of each of the terminals 110, the servers 120, and the printing devices 140 that constitute the printing system illustrated in FIG. 1 will be described.

Figure 2:
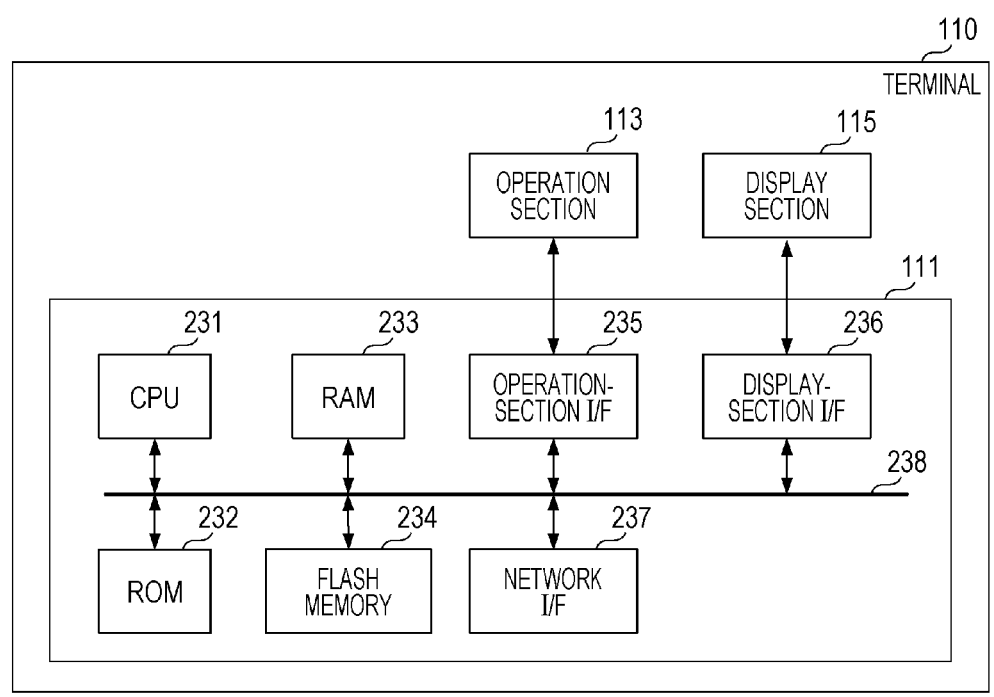
FIG. 2 is a block diagram illustrating an example of a hardware configuration of each terminal 110.

FIG. 2 is a diagram illustrating an example of a hardware configuration of each of the terminals 110.

As illustrated in FIG. 2, the terminal 110 includes a control section 111, an operation section 113, and a display section 115. The control section 111 connects the operation section 113 and the display section 115.

The control section 111 includes a central processing unit (CPU) 231, a read only memory (ROM) 232, a random access memory (RAM) 233, a flash memory 234, an operation-section interface (I/F) 235, a display-section I/F 236, and a network interface 237 for connecting the terminal 110 and a network. These individual units are connected to each other via a system bus 238. In the ROM 232, a control program for control, which is performed by the control section 111, of operations of the operation section 113 and the display section 115, and an electronic-mail transmission/reception program for transmission/reception, which is performed by the terminal 110, of an electronic mail to/from one of the servers 120 are stored.

The CPU 231 loads, analyzes, and executes the control program stored in the ROM 232, thereby controlling the operations of the operation section 113 and the display section 115.

Furthermore, the CPU 231 of the control section 111 loads the electronic-mail transmission/reception program, which is stored in the flash memory 234, into the RAM, and analyzes the program, thereby performing transmission/reception of electronic-mail data.

In the case of transmission of electronic-mail data, the control section 111 can, in accordance with a user's input provided from the operation section 113 via the operation-section I/F 235, attach electronic data (hereinafter, also referred to as an electronic file), which is stored in the flash memory 234, to an electronic mail, and transmit the electronic mail. In contrast, in the case of reception of electronic-mail data, the control section 111 controls the display section 115 via the display-section I/F 236 so that the control section 111 can cause the display section 115 to display the contents of an electronic mail received from the server 120.

Moreover, in the flash memory 234, a program for performing a process illustrated by a flowchart of FIG. 5 described below is stored. Then, the CPU 231 loads this program into the RAM 233, and analyzes the program, whereby the terminal 110 performs the process illustrated by the flowchart of FIG. 5.

Next, a hardware configuration of each of the servers 120 will be described in detail using FIG. 3.

Figure 3:
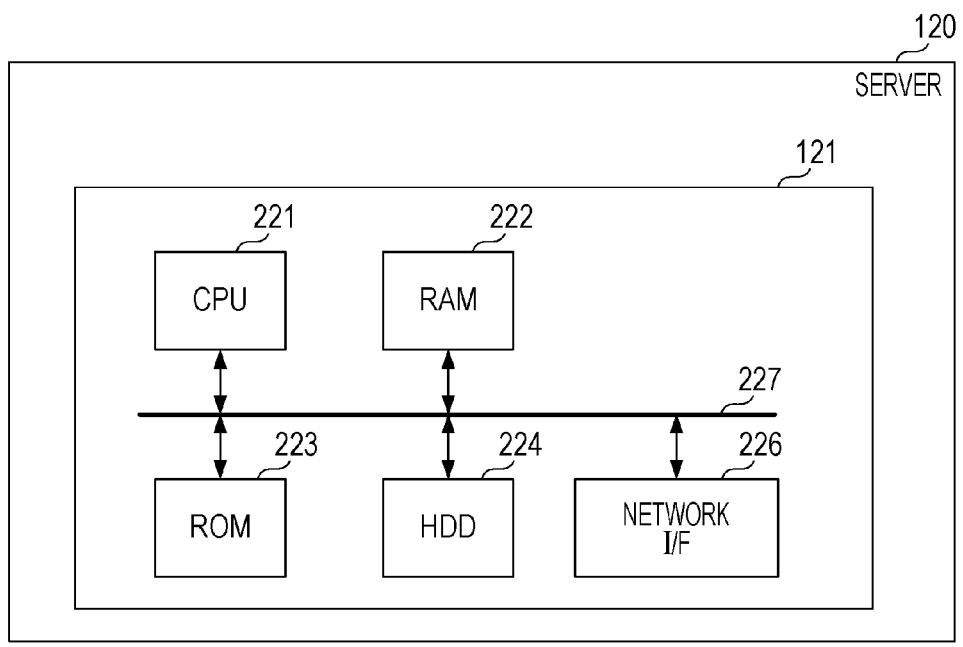
FIG. 3 is a block diagram illustrating an example of a hardware configuration of each server 120.

As illustrated in FIG. 3, a control section 121, which is included in the server 120, includes a CPU 221, a RAM 222, a ROM 223, a hard disk drive (HDD) 224, and a network I/F 226. These units are connected to each other via a system bus 227. The network I/F 226 is connected to a network I/F of each of the printing devices 140 via the WAN 130, and performs transmission/reception of a file.

In the ROM 223, a control program for controlling an operation of the server 120 is stored. The CPU 221 loads this control program into the RAM 222, and analyzes and executes the program, whereby the control section 121 controls the operation of the entire server 120. Furthermore, in the HDD 224, an electronic-mail transmission/reception program for transmitting/receiving an electronic mail to/from one of the terminals 110 is stored. The CPU 221 loads this electronic-mail transmission/reception program into the RAM 222, and analyzes the program, whereby transmission/reception of an electronic mail between the terminal 110 and the server 120 is performed.

Additionally, in the HDD 224, a file transmission/reception program for transmitting/receiving a file to/from one of the printing devices 140, and a print program for subjecting a received file to image processing are stored. The CPU 221 loads this file transmission/reception program into the RAM 222, and analyzes the program, whereby the server 120 performs a process of transmitting/receiving a file to/from the printing device 140. Moreover, the CPU 221 loads this print program into the RAM 222, and analyzes the program, whereby the server 120 performs image processing on a file.

Additionally, in the HDD 224, a print program for analyzing data of an electronic mail received from one of the terminals 110 and performing, on a file attached to the electronic mail, a process illustrated by a flowchart of FIG. 7 or FIG. 16 described below is stored. The CPU 221 loads this print program into the RAM 222, and analyzes the program, whereby the server 120 performs various types of processes on a received file.

Next, a hardware configuration of each of the printing devices 140 will be described in detail using FIG. 4.

Figure 4:
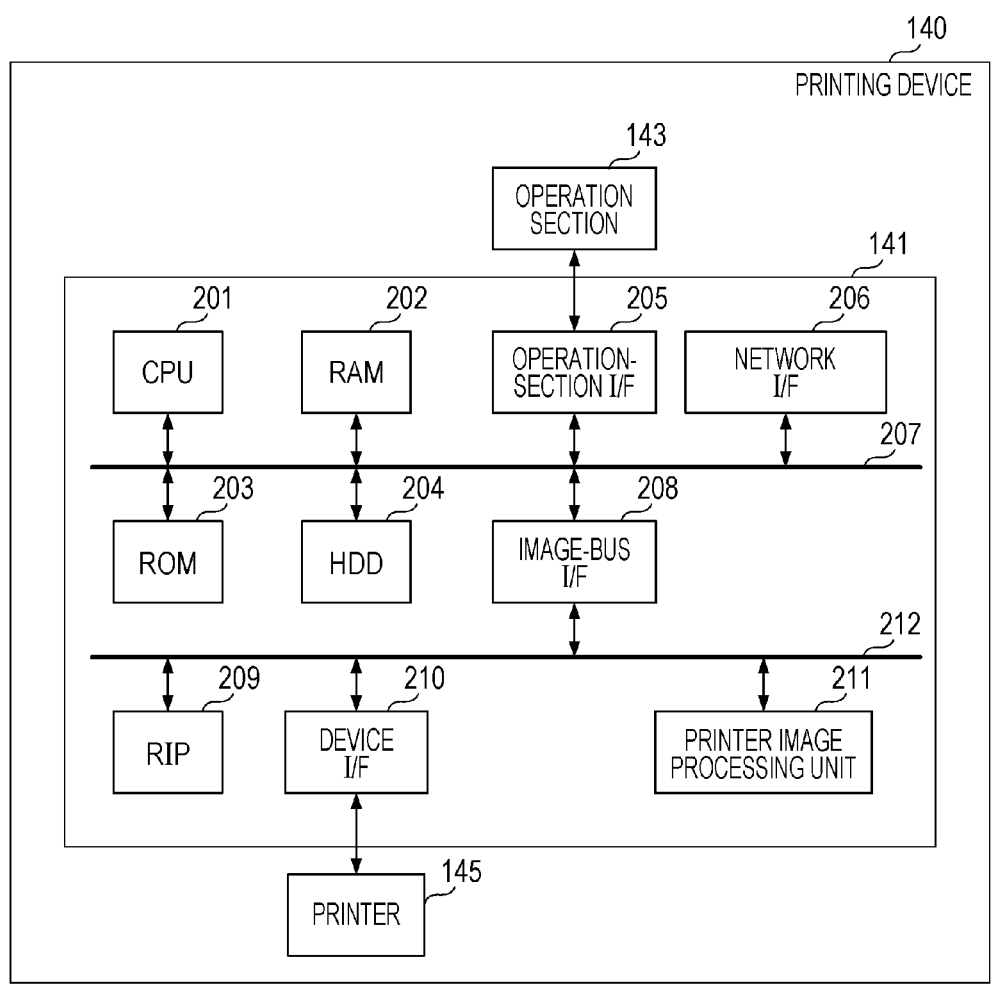
FIG. 4 is a block diagram illustrating an example of a hardware configuration of each printing device 140.

As illustrated in FIG. 4, a control section 141 of the printing device 140 is electrically connected to a printer 145, and, meanwhile, is connected to external devices (such as the terminals 110 or the servers 120) via networks. Accordingly, the printing device 140 can input/output a file of image data or the like, or device information.

A CPU 201 collectively controls, on the basis of a control program or the like stored in a ROM 203, accesses to various types of devices that are being connected, and also collectively controls various types of processes performed by the control section 141.

A RAM 202 is a system work memory that is used by the CPU 201 for an operation of the CPU 201, and is also a memory for temporarily storing image data. This RAM 202 includes a non-volatile static RAM (SRAM) in which stored contents are held after the power is turned off and a dynamic RAM (DRAM) in which stored contents are erased after the power is turned off.

In the ROM 203, a boot program or the like for the device is stored. An HDD 204 is a hard disk drive, and is capable of storing system software or image data. In this HDD 204, a program for performing a program illustrated by a flowchart described below. The CPU 201 loads this program into the RAM 202, and analyzes the program, whereby the printing device 140 performs the process.

An operation-section I/F 205 is an interface section for connecting a system bus 207 and an operation section 143. This operation-section I/F 205 receives, from the system bus 207, image data that is to be displayed on the operation section 143, and outputs the image data to the operation section 143. In addition, the operation-section I/F 205 outputs, to the system bus 207, information that has been input from the operation section 143.

A network I/F 206 is connected to the WAN 130 and the system bus 207, and performs inputting/outputting of information. Moreover, the network I/F 206 is connected to the network I/F of each of the servers 120 via the WAN 130, and also performs transmission/reception of a file.

An image-bus I/F 208 is an interface that connects the system bus 207 and an image bus 212 for transferring image data at a high speed, and functions as a bus bridge that converts a data structure.

The image bus 212 is a transmission path for transmitting/receiving image data, and is configured using a PCI (Peripheral Component Interface) bus or IEEE 1394 (Institute of Electrical and Electronics Engineers 1394). Furthermore, a RIP (Raster Image Processor) 209, a device I/F 210, and a printer image processing unit 211 are connected to the image bus 212.

The RIP 209 generates raster data on the basis of a DL (DisplayList) that is generated by conversion, which is performed by the CPU 201, of PDL (Page Description Language) data that has been received from the network I/F 206.

The device I/F 210 is an interface that connects the printer 145 and the control section 141. The device I/F 210 converts image data, and temporarily holds input/output data using a buffer memory that is not illustrated.

The printer image processing unit 211 performs, on output image data that is to be output to the printer 145, a process, such as color conversion, a filtering process, or resolution conversion.

The details illustrated in FIGS. 1-4 and described above regarding the hardware configuration diagram of each of the terminals 110, the servers 120, and the printing devices 140 that constitute the printing system illustrated in FIG. 1 functionally interact in a manner corresponding to various units. For example, the hardware configuration diagram of each of the terminals 110 illustrated in FIG. 2 may functionally operate as a search-request transmitting unit, a search-response receiving unit, and a mail transmitting unit.

The hardware configuration diagram of each server 120 illustrated in FIG. 3 may functionally operate as a server and a determining unit. Similarly, the hardware configuration diagram of each printing device 140 illustrated in FIG. 4 may functionally operate as a holding unit, a search-request receiving unit, a search-response transmitting unit, a mail receiving unit, a printing unit, a change unit, a prevention unit, a print control unit, and a token transmitting unit.

Next, the details of the process performed in each of the terminals 110 in the present embodiment will be described using FIG. 5. The process illustrated by the flowchart of FIG. 5 starts in response to reception of, from a user, an operation for printing an electronic file.

Figure 6A:
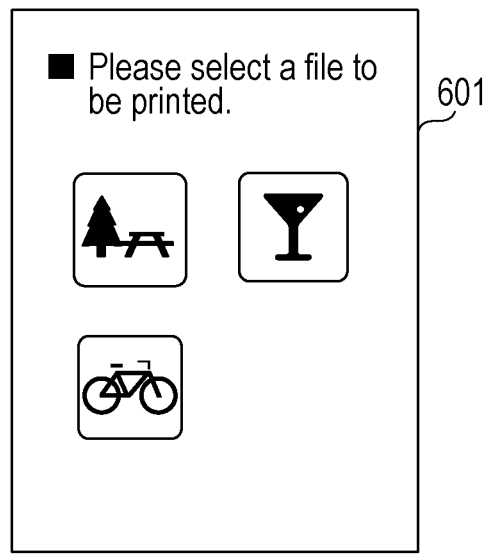
FIG. 6A is a diagram illustrating an example of a screen for selecting a print file and a printing device in the terminal 110.

First, prior to a process of S501, the control section 111 of the terminal 110 displays, on the display section 115, a selection screen for selecting a print target file, which is illustrated in FIG. 6A. The control section 111 accepts, from the user, an instruction to select a print target file from a list of files displayed on 601, and decides a print target file.

Upon decision of a print target file in the file selection screen illustrated in FIG. 6A, in S501, the control section 111 of the terminal 110 transmits a print-service search request to a network.

The print-service search request is a request for, for example, _printer, _pdl-datastream, or _ipp service search of Multicast DNS (hereinafter, referred to as mDNS). In addition, the print-service search request may be a request for, for example, a print service search of Service Location Protocol (hereinafter, referred to as SLP).

The print-service search request is transmitted, using multicasting, to the network that is separated by a router and to which the terminal 110 belongs. When the print-service search request is transmitted, using multicasting, to the network, in the case where a printing device is installed within a range of the same network (or the same sub-network), the printing device transmits a response to the print-service search request.

Note that, in the present embodiment, it is supposed that, a setting with which a multicast packet transmitted to the network is not transmitted to other networks which are separated by the router is set in the router.

In S502, in the case where printing devices are provided within the same network to which the terminal 110 belongs, the control section 111 of the terminal 110 receives a print-service search response (FIG. 7) from each of the printing devices. In the print-service search response, at least information concerning an electronic-mail-address attribute and an authentication-token attribute is included. This authentication token is used in the case where authentication is performed by the printing device. In the present embodiment, a system configuration is used, in which only a terminal belonging to the same network to which a printing device belongs can obtain an authentication-token attribute of the printing device, and in which, meanwhile, the printing device permits only printing of an electronic mail to which the authentication-token attribute is attached.

The details of a printing-service search response including information concerning an electronic-mail-address attribute and an authentication-token attribute will be described with reference to FIG. 7. A printing-service search response illustrated in FIG. 7 is an example of the printing-service search response received from one of the printing devices in S502.

701 indicates formats in which the printing device 140 that is the transmission source of the search response is capable of performing printing. In an example illustrated in FIG. 7, it is indicated that the printing device is capable of performing printing in JPEG (Joint Photographics Expert Group) and TIFF (Tagged Image File Format) data formats. 702 indicates whether or not the printing device 140 is capable of performing color printing. In the example illustrated in FIG. 7, because True is set, it is indicated that the printing device 140 can perform color printing. 703 indicates whether or not the printing device 140 is capable of performing duplex printing. In the example illustrated in FIG. 7, because False is set, it is indicated that the printing device 140 is not capable of performing duplex printing. 704 indicates an electronic-mail address that is assigned to the printing device 140. In the example illustrated in FIG. 7, printer_kaihatsu1@xxxxx.jp is assigned as an electronic-mail address attribute to the printing device 140. 705 indicates an authentication token that the printing device 140 holds. In the present embodiment, it is indicated that "281868ec-f797-425f-b1c1-7b03c264" is an authentication token of the printing device 140. Note that, although a process of generating an authentication token will be described below, the authentication token is regularly changed at predetermined time intervals.

In S503, the control section 111 of the terminal 110 extracts the information concerning electronic-mail-address attributes and authentication-token attributes from the printing-service search responses that have been received in S502, and manages the information on a printing-device-by-printing-device basis so that the information is associated with the printing devices described above.

In S504, the control section 111 of the terminal 110 performs list display of a list of transmission sources of the printing-service search responses as a printing-device selection screen on the display section 115. In the case of performing list display, the control section 111 displays the information concerning electronic-mail-address attributes extracted in S503. Accordingly, the user of the terminal 110 selects the electronic-mail address of a desired printing device from among one or a plurality of printing devices that have been found by search, whereby the user can specify a printing device. Note that, if the information displayed by performing list display is information by which printing devices can be identified, the information may be not necessarily the information concerning electronic-mail-address attributes.

Figure 6B:
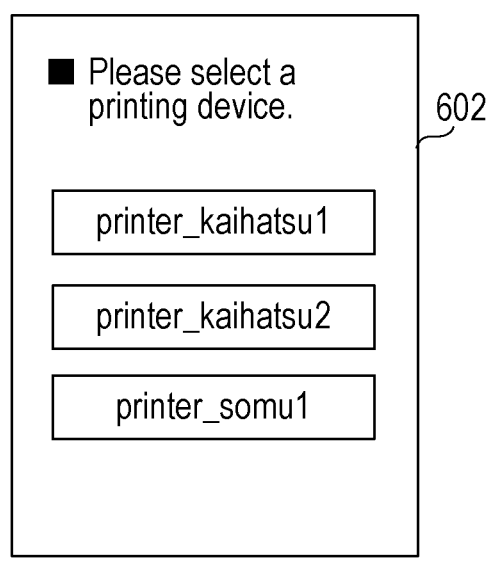
FIG. 6B is a diagram illustrating an example of a screen for selecting a print file and a printing device in the terminal 110.

FIG. 6B is a screen to which the screen is shifted from the screen illustrated by FIG. 6A by receiving the printing-service search responses in S502 and which is displayed.

As 602 of FIG. 6B, the terminal 110 performs list display of a list of printing devices that have been found by search in S501 and S502. In the screen illustrated by FIG. 6B, the terminal 110 accepts, using an operation performed by the user via the operation section 113, an instruction to select a device for printing the print target file. When the user selects a desired printing device, the terminal 110 starts a process for transmitting an electronic mail, to which an authentication token is added, to the selected printing device. The control section 111 of the terminal 110 performs a process, which will be described in S505 and thereafter, of transmitting print data.

In S505, the control section 111 of the terminal 110 reads an electronic-mail-address attribute and an authentication-token attribute of the selected printing device from the attribute data extracted in S503.

In S506, the control section 111 of the terminal 110 attaches the print target file, which has been selected by the user, to an electronic mail. Furthermore, the control section 111 adds the authentication-token attribute, which has been read in S505, to the header portion of the electronic mail. Then, the control section 111 transmits the electronic mail, to which the authentication-token attribute has been added, to a destination indicated by the electronic-mail-address attribute, which has been read in S505. The control section 111 finishes the process illustrated by the present flowchart.

Next, a printing-service-search-response process performed in each of the printing devices 140 in the present embodiment will be described using FIG. 8. The process illustrated by a flowchart of FIG. 8 is a process that, when the printing-service search request has been transmitted from the terminal 110 in S502, is performed by the printing device belonging to the same network to which the terminal 110 belongs.

In S801, the control section 141 of the printing device 140 receives the printing-service search request from the terminal 110.

Figures 7, 8:
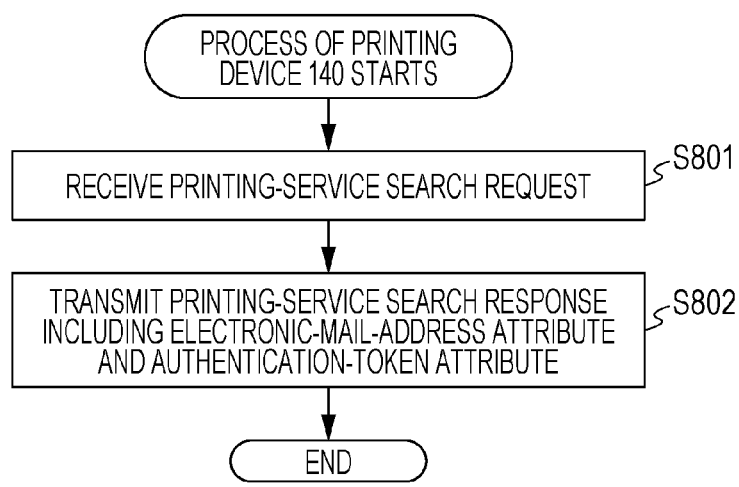
FIG. 7 is a diagram illustrating an example of a printing-service search response that is transmitted by the printing device 140.
FIG. 8 is a flowchart illustrating a process, which is performed in the printing device 140, of transmitting the printing-service search response.

In S802, the control section 141 of the printing device 140 transmits a printing-service search response, which is illustrated in FIG. 7, including an electronic-mail-address attribute and an authentication-token attribute to the terminal 110. Attribute information included in the printing-service search response is stored in the SRAM included in the RAM 202 of the printing device 140.

Figure 9:
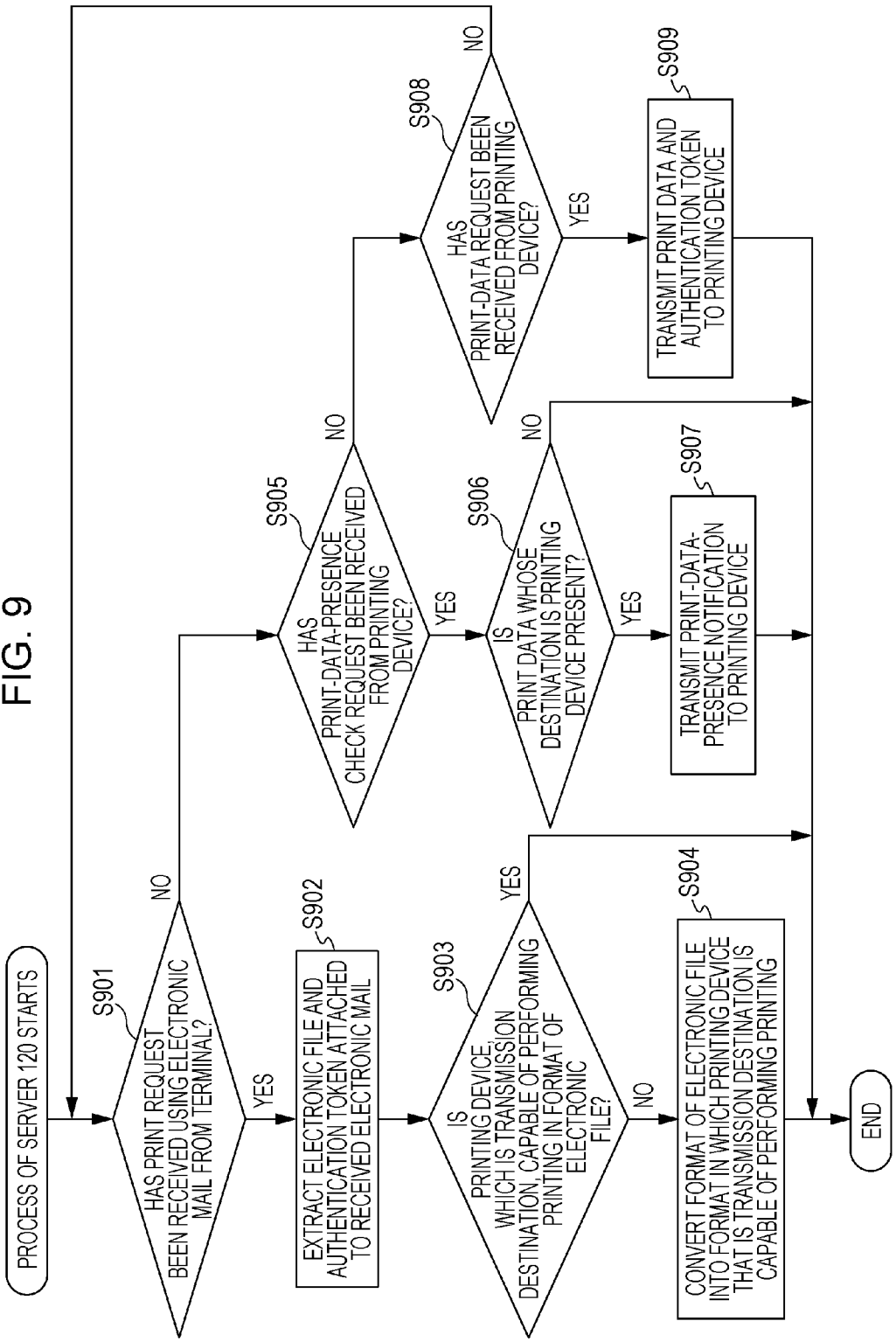
FIG. 9 is a flowchart illustrating a process performed in the server 120.

Next, the details of a process performed in each of the servers 120 in the present embodiment will be described using FIG. 9. Regarding the flowchart of FIG. 9, the process starts in response to reception of a predetermined request from one of the terminals 110 or the printing devices 140.

In S901, the control section 121 of the server 120 determines whether or not the server 120 has received an electronic mail whose destination is one of the printing devices. When YES is a result of the determination, the process proceeds to S902. When NO is a result of the determination, the process proceeds to S905.

In S902, the control section 121 of the server 120 stores, in the HDD 224, an electronic file attached to electronic-mail data that has been received. Note that, in the case where an authentication token is added to the electronic-mail data, the control section 121 extracts the authentication token, and stores the authentication token in the HDD 224 in a state in which the authentication token is associated with the attached electronic file.

In S903, the control section 121 of the server 120 identifies the format of the electronic file extracted in S902. Then, the control section 121 determines whether or not the printing device that is a transmission destination is capable of performing printing in the identified format (i.e., whether or not the printing device supports printing in the above-mentioned format).

Note that, in order to perform the determination in S903, it is supposed that the server 120 holds, in advance, a table in which formats supported by the printing devices are registered.

Regarding a method for generating the present table, for example, the printing devices notify the server 120 of supported formats, and the server 120 registers the formats in a table, thereby generating the table. When, in S903, the control section 121 determines that the format of the electronic mail is not a format in which the printing device that is a transmission destination is capable of performing printing (NO in S903), the process proceeds to S904. In S904, the control section 121 of the server 120 converts the format of the electronic file into a format supported by the printing device which is a transmission destination, and stores the electronic data in the HDD 224.

In contrast, when the control section 121 determines that the format of the electronic file is a format supported by the printing device which is a transmission destination (NO in S903), the control section 121 finishes the process illustrated by the present flowchart, without performing the above-mentioned format conversion in the server 120.

Note that, in the case of storage of the electronic file in the HDD 224 in S902 and S904, the control section 121 of the server 120 stores relationship information indicating the relationships between the electronic file and the printing device by which the electronic file is to be printed.

In S905, the control section 121 of the server 120 determines whether or not the server 120 has received, from one of the printing devices 140, a request (a print-data-presence check request) to check whether print data whose destination is the subject device is present in the server 120. When the control section 121 determines that the server 120 has received a print-data-presence check request, the process proceeds to S906. The control section 121 checks, by referring to the relationship information stored in the HDD 224, whether print data whose destination is this printing device is present in the HDD 224.

When, in S906, the control section 121 determines that the print data is present, the process proceeds to S907, and transmits a notification (a print-data-presence notification) indicating that the print data is present. Note that, in this print-data-presence notification, for example, an identifier (ID) by which print data is identified is included.

When, in S906, the control section 121 determines that the print data is not present, the control section 121 notifies the printing device that the print data whose destination is the printing device that has transmitted the request is not present in the server 120, as a response to the print-data-presence check request, which has been received in S905. The control section 121 finishes the process illustrated by the present flowchart.

Next, in S908, the control section 121 of the server 120 determines whether or not the server 120 has received, from one of the printing devices 140, a request (a print-data request) to obtain print data. When the control section 121 determines that the server 120 has received a print-data request, the process proceeds to S909. When the control section 121 determines that the server 120 has not received a print-data request, the process proceeds to S901.

In S909, the control section 121 of the server 120 transmits, in accordance with the received print-data request, to the printing device 140, print data and an authentication token that is associated with the print data. Note that, in the case where print data whose destination is the printing device 140 is not present, the control section 121 notifies, as a response to the print-data request which has been received in S908, the printing device that the print data is not present. The control section 121 finishes the process illustrated by the present flowchart.

Figure 10:
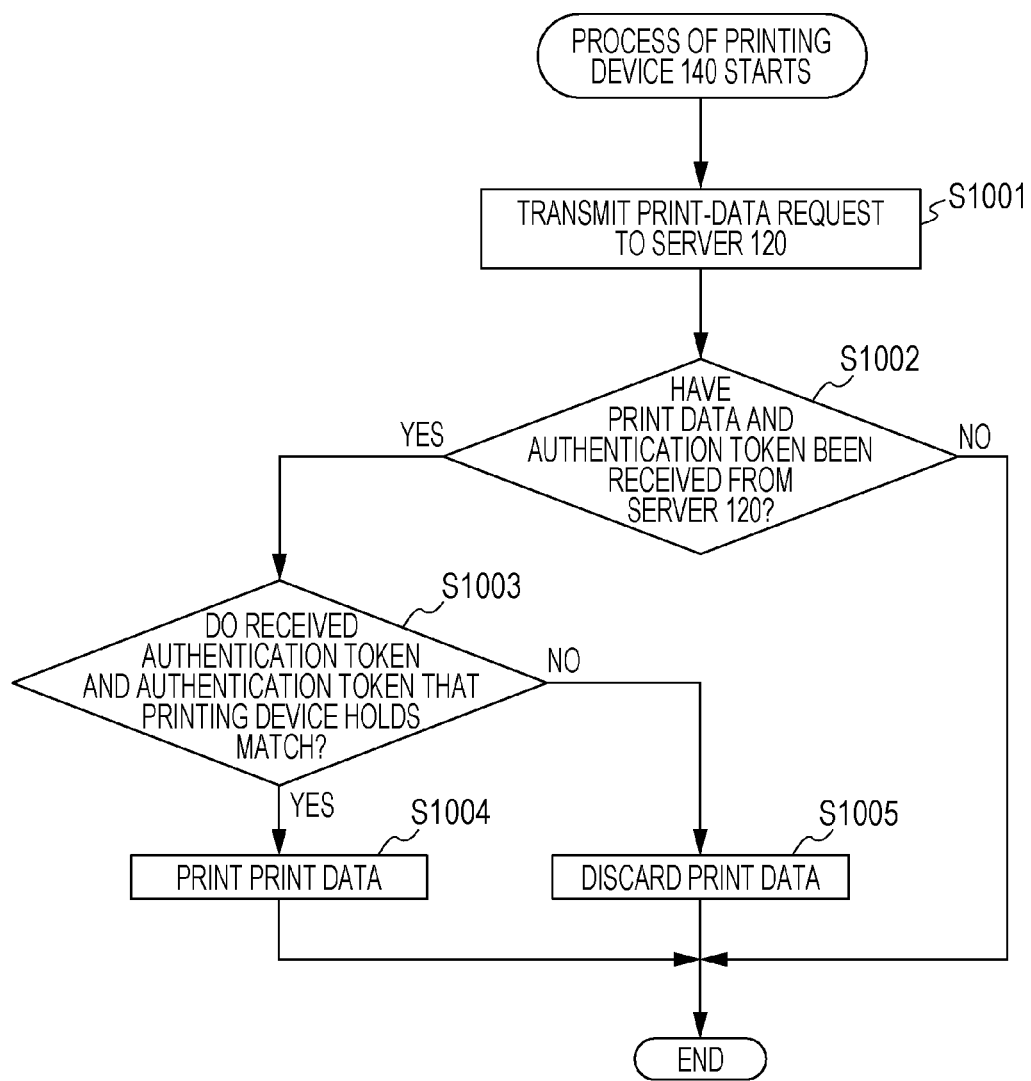
FIG. 10 is a flowchart illustrating a printing process performed in the printing device 140.

Next, a printing process performed in each of the printing devices 140 in the present embodiment will be described using FIG. 10. Note that, prior to the process illustrated by this flowchart, the printing device 140 regularly transmits a print-data presence check request to the servers 120 at predetermined time intervals. Then, the process illustrated by the present flowchart starts in response to reception of a print-data presence notification indicating that print data is present from one of the servers 120.

In S1001, the control section 141 of the printing device 140 transmits a print-data request to the server 120.

In S1002, the control section 141 of the printing device 140 determines whether or not the printing device 140 has received print data and an authentication token from the server 120. When the printing device 140 has received print data and an authentication token from the server 120, the process proceeds to S1003. When the printing device 140 has not received an authentication token, the process proceeds to S1006.

In S1003, the control section 141 of the printing device 140 determines whether the authentication token, which has been received together with the print data in S1002, matches an authentication token that the printing device 140 holds, thereby performing authentication.

As a result of determination performed in S1003, when the authentication tokens match, the process proceeds to S1004. In S1004, the control section 141 of the printing device 140 performs, on the received print data, a rendering process using the printer image processing unit 211. The control section 141 transmits intermediate data (for example, display-list data) to the printer 145 via the device I/F 210, and performs printing.

As a result of determination performed in S1003, when the authentication tokens do not match, in S1005, the control section 141 of the printing device 140 discards the print data received in S1002.

Next, a configuration will be described, in which each of the printing devices 140 regularly changes an authentication token that the printing device 140 holds.

Figure 11:
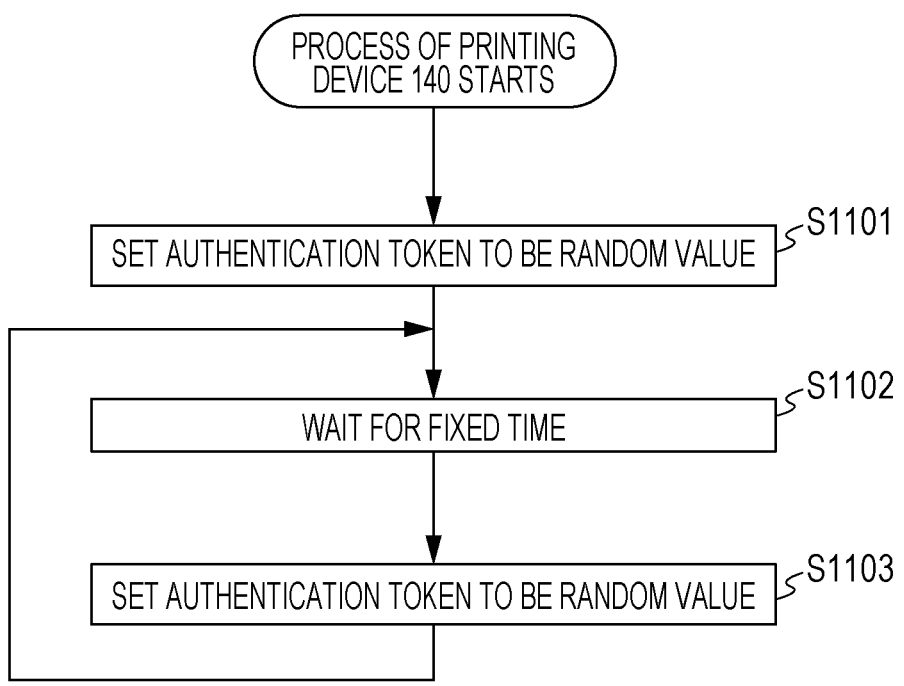
FIG. 11 is a flowchart illustrating a process, which is performed in the printing device 140, of changing an authentication token.

FIG. 11 is a flowchart illustrating an authentication-token change process performed in each of the printing devices 140 in the present embodiment. When the printing device 140 is activated, in S1101, the control section 141 of the printing device 140 sets the authentication token to be a random value, and holds the value in the RAM 202.

In S1102, the control section 141 of the printing device 140 waits the process for a fixed time. In S1103, the control section 141 of the printing device 140 sets, again, the authentication token to be a random value, and holds the value in the RAM 202. Note that the authentication token included in the printing-service search response that the printing device 140 transmits in S802 is the authentication token held by the RAM 202 in S1103.

In the present embodiment, using a mechanism of printing service search, a configuration is used, in which, if a terminal belongs to the same network to which a printing device belongs, the terminal can obtain an authentication token and an electronic-mail address. By using such a configuration, printing from only a terminal belonging to the same network can be permitted, and printing from a terminal belonging to another network can be prohibited. As a result, the printing device can be prevented from coming under attack, such as transmission of files having a large amount of data using electronic mails from a user's terminal provided in the other network.

Furthermore, in the present embodiment, because each of the printing devices 140 regularly changes the authentication token as described above, even in the case where leakage of the electronic-mail address and the authentication token to a user of a terminal belonging to another network occurs, when the authentication token of the printing device 140 is changed, it becomes impossible for the user to perform printing. Accordingly, a damage caused by the leakage of the electronic-mail address can be minimized.

Second Embodiment

In the first embodiment, there is a problem that, when the authentication token which one of the printing devices 140 holds is changed after a print-data request has been transmitted, even for a print request made from an authorized user, printing is refused.

In view of this issue, in a second embodiment, when an authentication-token update prevention flag for the authentication token is ON, the authentication token is prevented from being changed.

Because a system configuration and a hardware configuration in the second embodiment are similar to those in the first embodiment, a description thereof is omitted.

Figure 12:
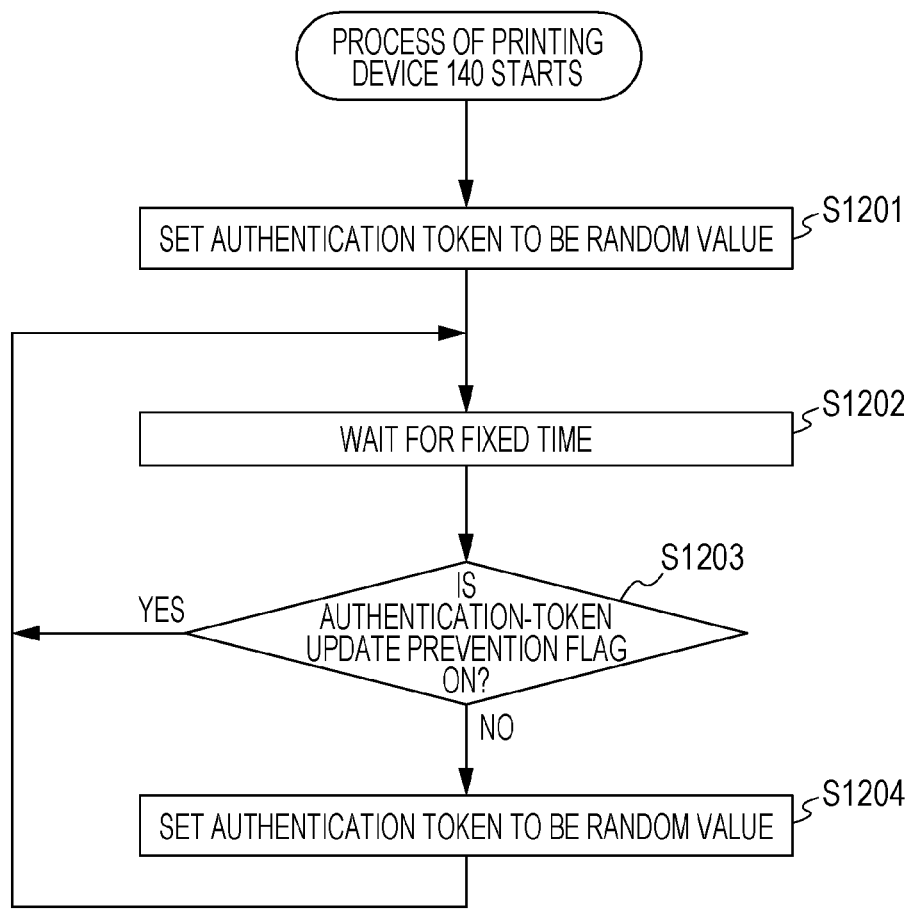
FIG. 12 is a flowchart illustrating a process, which is performed in the printing device 140 in a second embodiment, of changing an authentication token.

FIG. 12 is a flowchart of a process performed in each of the printing devices 140 in the present embodiment. The CPU 201 executes the program stored in the HDD 204 of the printing device 140, thereby realizing a process of each step in this flowchart.

When the printing device 140 is activated, in S1201, the control section 141 of the printing device 140 sets the authentication token to be a random value, and holds the value in the RAM 202.

In S1202, the control section 141 of the printing device 140 waits the process for a fixed time. In S1203, the control section 141 of the printing device 140 determines whether the authentication-token update prevention flag, which indicates that the authentication token is temporarily prevented from being changed, is ON. Note that the authentication-token update prevention flag is stored in the printing device 140 so as to be associated with the authentication token.

When the control section 141 determines that the authentication-token update prevention flag is ON (YES in S1203), updating of the authentication token is not performed. In S1202, the process shifts, again, to the process of waiting for a fixed time. Furthermore, when a result of determination in S1203 is NO, in S1204, a process of updating the authentication token is performed following a procedure similar to that used in S1201. After that, in S1202, the process shifts to the process of waiting.

Figure 13:
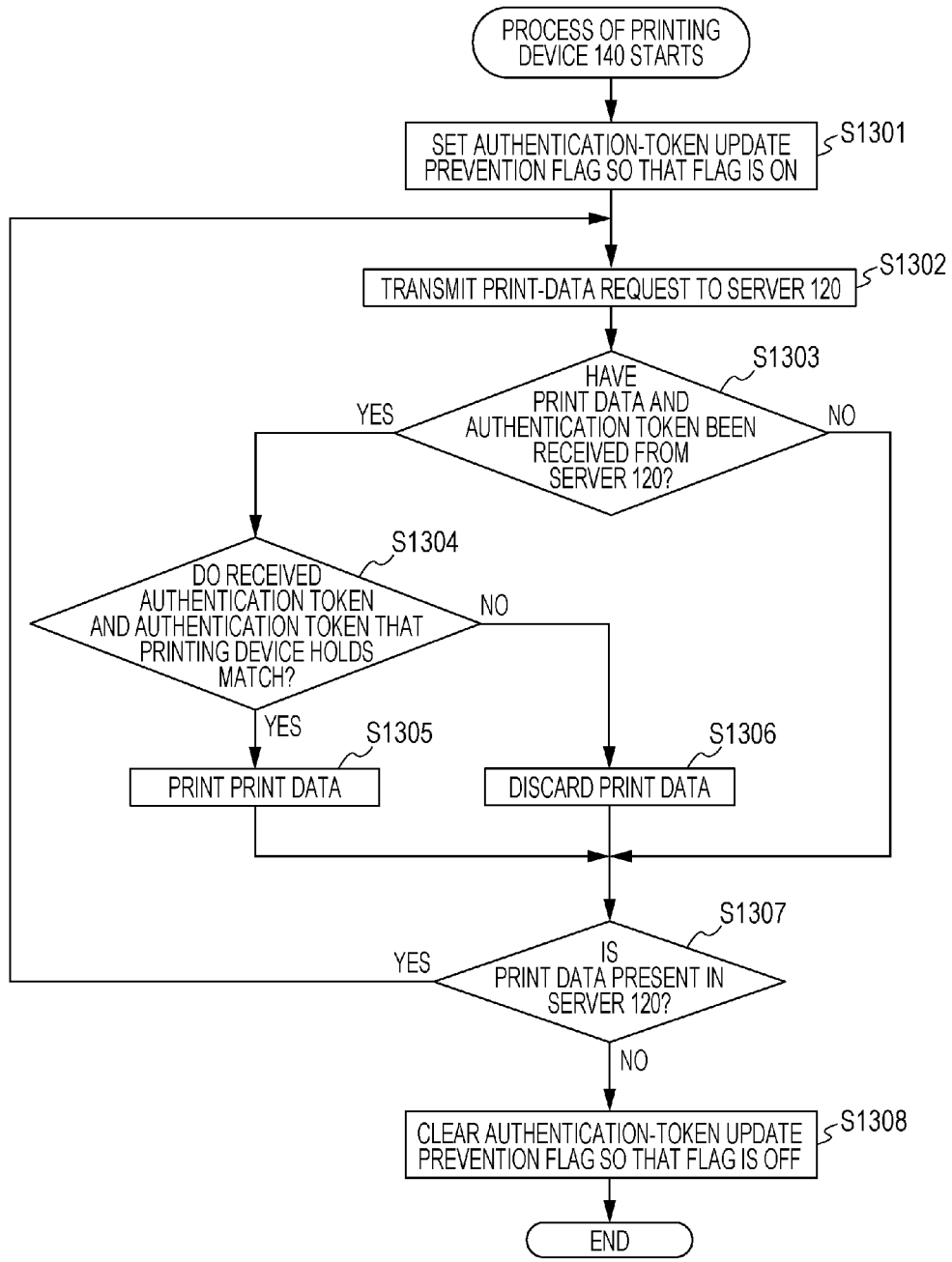
FIG. 13 is a flowchart illustrating a printing process performed in the printing device 140 in the second embodiment.

FIG. 13 is a flowchart of a printing process performed in each of the printing devices 140 in the present embodiment. Regarding this flowchart, the process starts in response to reception of a print-data-presence notification from one of the servers 120.

In S1301, the control section 141 of the printing device 140 sets the authentication-token update prevention flag so that the flag is ON.

In S1302, the control section 141 of the printing device 140 transmits a print-data request to one of the servers 120.

In S1303, the control section 141 of the printing device 140 determines whether the printing device 140 has received print data and an authentication token from the server 120. When the printing device 140 has received print data and an authentication token from the server 120, in S1304, the control section 141 of the printing device 140 determines whether the received authentication token matches an authentication token that the printing device 140 holds.

When, in S1304 described above, the control section 141 determines that the authentication tokens match, the process proceeds to S1305. In S1305, the control section 141 of the printing device 140 performs, on the received print data, a rendering process using the printer image processing unit 211. The control section 141 transmits intermediate data (for example, display-list data) to the printer 145 via the device I/F 210, and performs printing.

Furthermore, when, in S1403, the control section 141 determines that the authentication tokens do not match, in S1306, the control section 141 of the printing device 140 discards the received print data.

After the process of S1350 or S1306 has been completed, in S1401, the control section 141 of the printing device 140 transmits a print-data request to the server 120.

In S1307, when the control section 141 of the printing device 140 determines that another piece of print data is present in the server 120, in S1302, the control section 141 transmits the print-data request again, thereby continuously performing the printing process. In S1307, when the control section 141 of the printing device 140 determines that no print data is present in the server 120, in S1308, the control section 141 clears the authentication-token update prevention flag so that the flag is OFF, and finishes the process illustrated by the present flowchart.

Third Embodiment

In a third embodiment, a configuration will be described, in which, as a result of determination performed in S1003, even when the authentication tokens do not match in the first embodiment, the control section 141 does not discard the print data and performs retention printing.

Here, retention printing is printing in which, a print instruction is input on a panel of the operation section 143 of one of the printing devices 140, whereby printing starts.

The aim of the third embodiment is that, even when a mismatch between the authentication tokens occurs and printing is rejected, if a user can perform an operation on the printing device 140, the user is considered as an authorized user, and printing is prevented from failing.

Figure 14:
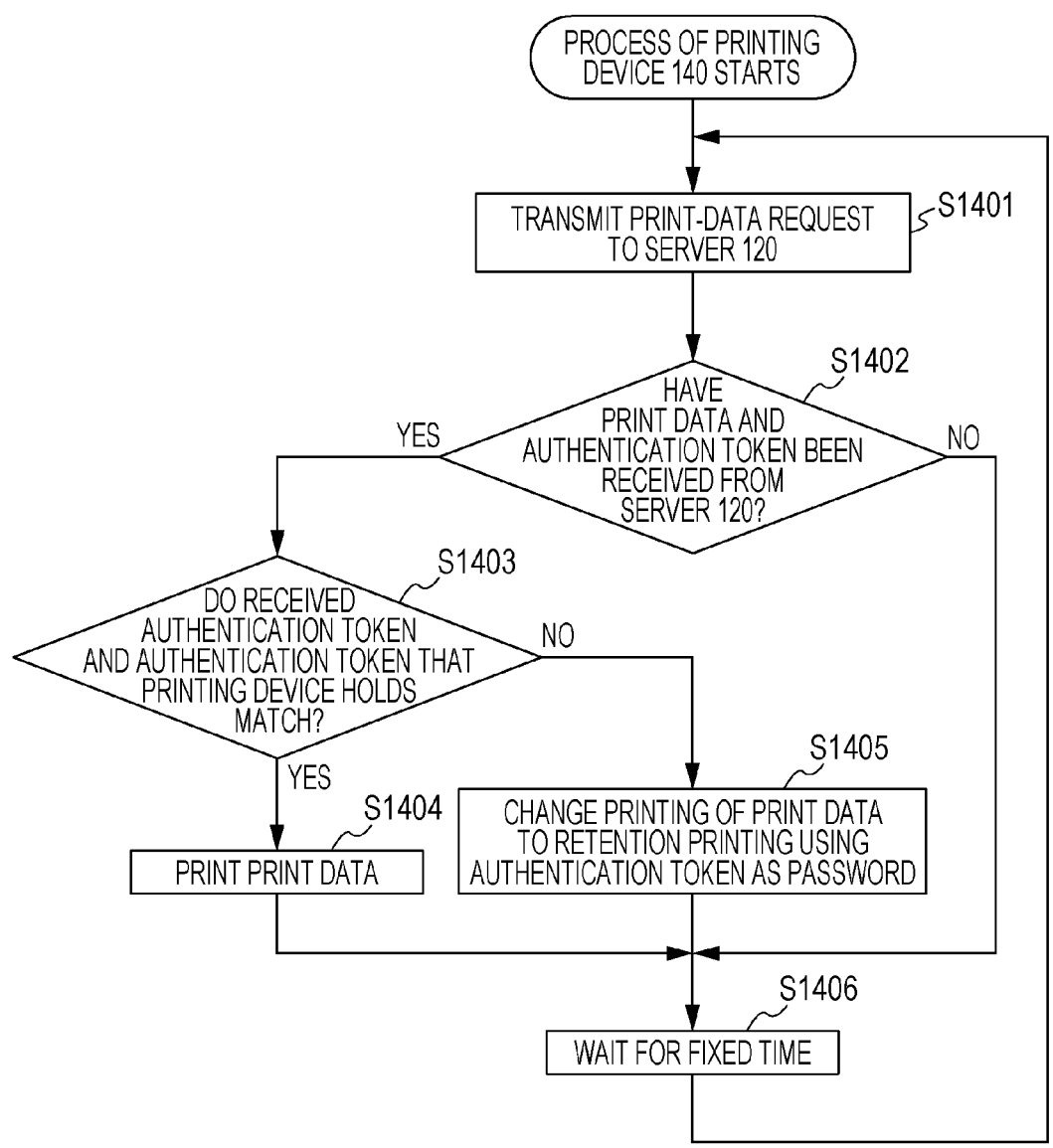
FIG. 14 is a flowchart illustrating a printing process performed in the printing device 140 in a third embodiment.

FIG. 14 is a flowchart illustrating a printing process performed in each of the printing devices 140.

In S1401, the control section 141 of the printing device 140 transmits a print-data request to one of the servers 120. In S1402, the control section 141 of the printing device 140 determines whether the printing device 140 has received print data and an authentication token from the server 120. When the printing device 140 has received print data and an authentication token from the server 120, in S1403, the control section 141 of the printing device 140 determines whether the received authentication token matches an authentication token that the printing device 140 holds. As a result of determination performed in S1403, when the authentication tokens match, the process proceeds to S1404.

In S1404, the control section 141 of the printing device 140 performs, on the received print data, a rendering process using the printer image processing unit 211. The control section 141 transmits intermediate data (for example, display-list data) to the printer 145 via the device I/F 210, and performs printing. When the printing device 140 has not received print data and an authentication token from the server 120, the control section 141 does not perform any process. Furthermore, as a result of determination performed in S1403, when the authentication tokens do not match, in S1405, the control section 141 of the printing device 140 changes printing of the received data to retention printing using the authentication token as a password.

Specifically, the control section 141 associates the print data and the authentication token, which have been received in S1402, with each other, and stores the print data and the authentication token in the HDD 204 until a print instruction is provided using the operation section 143 from a user.

Then, a user inputs a print instruction using the operation section 143 of the printing device 140, whereby the control section 141 performs printing of the print data stored (retained) in the HDD 204.

Note that, in the case where printing of the retained print data is performed, the user may be caused to input a password. Moreover, the authentication token is used as a password that is to be input by the user, whereby an advantage that a user who does not know the authentication token cannot perform printing of the retained print data is provided.

In the case where the authentication token is used as a password for starting a process of performing retention printing, an authorized user needs to know the authentication token. For this reason, for example, in the case where the selection screen for selecting a printing device, which is illustrated in FIG. 6B, is displayed, the authentication token of the printing device is also displayed, so that the user is notified of the authentication token.

After the process of S1404 or S1405 has been completed, the control section 141 of the printing device 140 waits for a fixed time in S1406, and, after that, repeats the processes of S1401 and thereafter.

Fourth Embodiment

A configuration in which each of the printing devices 140 regularly changes the authentication token has been described in the first embodiment. However, in the first embodiment, there is a case in which the authentication token is updated in the printing device 140 after the printing device has received print data before the printing device starts printing. In this case, there is an issue that, even when, in a proper manner, the authentication token is added to a mail and the mail is transmitted, printing fails.

For this reason, in a fourth embodiment, the printing device 140 holds a plurality of authentication tokens, and each of the authentication tokens has a period of validity, thereby solving the present issue.

Note that, because a system configuration and a hardware configuration in the fourth embodiment are similar to those in the first embodiment, a description thereof is omitted.

FIG. 15 illustrates an example of authentication tokens that are held in the HDD 204 of each of the printing devices 140 in the present embodiment. As illustrated in FIG. 15, in the present embodiment, the printing device 140 holds a plurality of authentication tokens having a period of validity of 60 minutes. Furthermore, each of the authentication tokens is issued every 30 minutes.

It is indicated that 1501 is an authentication token which was issued at 8:00 on 2011/5/23, and which will be valid until 9:00 on 2011/5/23.

Similarly, it is indicated that 1502 is an authentication token which was issued at 8:30 on 2011/5/23, and which will be valid until 9:30 on 2011/5/23. Moreover, it is indicated that 1503 is an authentication token which was issued at 9:00 on 2011/5/23, and which will be valid until 10:00 on 2011/5/23.

In the present embodiment, when an authentication token is issued, there is a delay of 30 minutes before an authentication token that is held becomes invalid. In other words, because two authentication tokens are in a valid state, print data transmitted from an authorized user is prevented from being discarded when switching between the authentication tokens is performed.

Fifth Embodiment

Although each of the printing devices 140 performs comparison between the authentication tokens in the first embodiment, in a fifth embodiment, a configuration in which each of the servers 120 performs comparison between the authentication tokens will be described.

Figure 16:
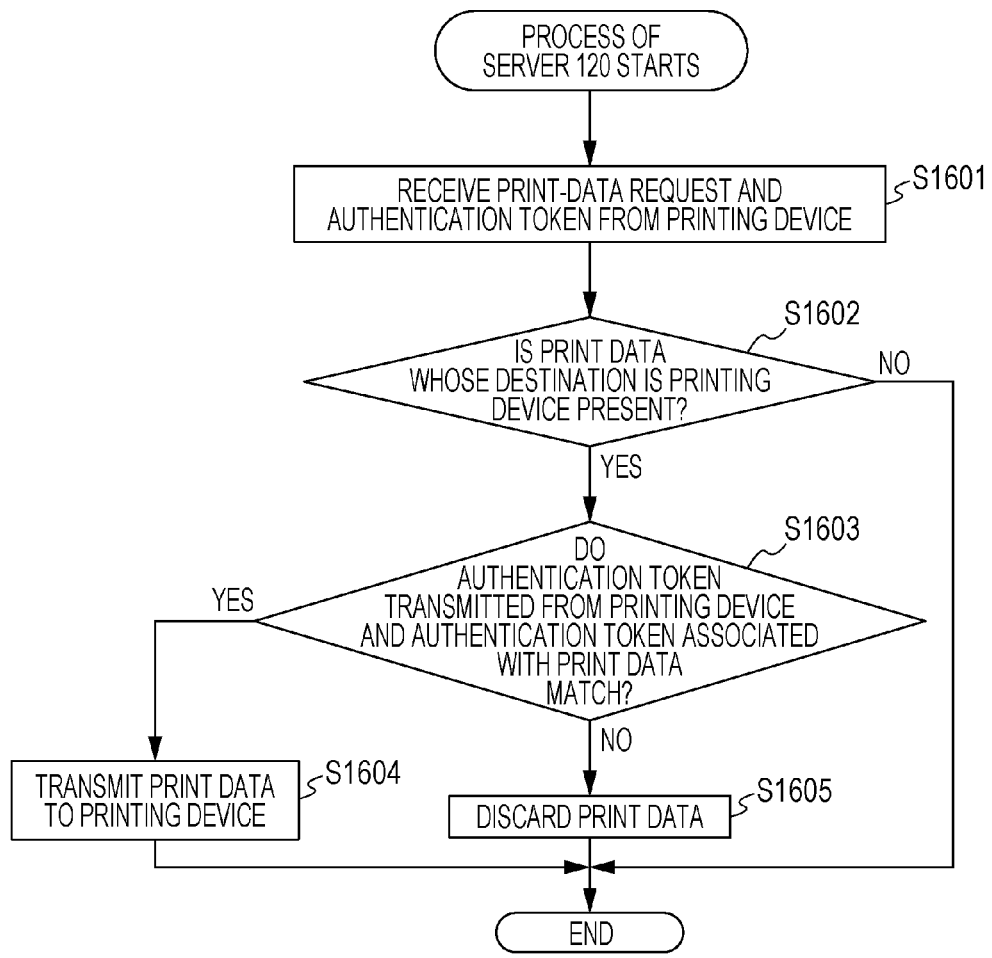
FIG. 16 is a flowchart illustrating a process performed in the server 120 in a fifth embodiment.

FIG. 16 is a flowchart of a process performed in each of the servers 120 in the present embodiment.

In S1601, the control section 121 of the server 120 receives a print-data request and an authentication token from one of the printing devices 140.

In S1602, the control section 121 of the server 120 checks, by referring to the relationship information stored in the HDD 224, whether print data whose destination is the printing device 140 that has transmitted the print-data request is present in the HDD 224. When the print data whose destination is the printing device 140 is present, the process proceeds to S1603. When the print data is not present, the control section 121 notifies the printing device that the print data is not present, as a response to the print-data request. The control section 121 finishes the process illustrated by the present flowchart.

In S1603, the control section 121 of the server 120 obtains the print data whose destination is the printing device that have transmitted the print-data request and an authentication token associated with the print data, which are stored in the HDD 224. Then, the control section 121 compares the authentication token received from the printing device 140 in S1601 with the obtained authentication token. As a result of comparison performed in S1603, when the authentication tokens match, the process proceeds to S1604. In S1604, the control section 121 of the server 120 transmits, to the printing device 140, the print data obtained in S1602.

Furthermore, as a result of comparison performed in S1603, when the authentication tokens do not match, in S1605, the control section 121 discards the print data stored in the HDD 224, and finishes the process illustrated by the present flowchart.

According to the present embodiment, there is an advantageous effect that, because the server 120 checks that the authentication tokens match, the printing device 140 does not need to perform a process of checking that the authentication tokens match.

Other Embodiments

Additionally, the claimed invention can be realized by performing the following process. In other words, software (a program) that realizes functions of any one of the above-described embodiments is supplied to a system or a device via a network or various types of storage media serving as a memory device (e.g., a non-transitory storage medium). The process is a process in which a computer (a CPU, a microprocessing unit (MPU), and/or the like) of the system or the device loads and executes the program.

According to the advantageous effects of the claimed invention, it is made possible for the printing system that prints an image based on a file attached to an electronic mail to preferably give permission for printing and reject printing.

While the claimed invention has been described with reference to exemplary embodiments, it is to be understood that the claimed invention is not limited to the disclosed exemplary embodiments. The scope of the following claims is to be accorded the broadest interpretation so as to encompass all such modifications and equivalent structures and functions.

This application claims priority from International Patent Application No. PCT/JP2011/073908, filed Oct. 18, 2011, which is hereby incorporated by reference herein in its entirety.

The invention claimed is:

1. A printing system comprising:
   a terminal that, by transmitting an electronic mail including an electronic file, makes a request to print the electronic file; and
   a printing device that prints an image based on an electronic file included in an electronic mail, the terminal and the printing device being connected to each other via a network,
   the terminal including
      a search-request transmitting unit configured to, in a case of performing printing of an electronic file, transmit a search request to search for a printing device to the network,
      a search-response receiving unit configured to receive an electronic-mail address and an authentication token of a printing device as a response to the search request transmitted by the search-request transmitting unit, and
      a mail transmitting unit configured to transmit an electronic mail including the authentication token, which has been received by the search-response receiving unit, and the electronic file to the electronic-mail address, which has been received by the search-response receiving unit,
   the printing device including
      a holding unit configured to hold an authentication token,
      a search-request receiving unit configured to receive a search request to search for a printing device from the network,
      a search-response transmitting unit configured to transmit, in a case where the search request has been received by the search-request receiving unit, to a device that is a transmission source of the search request, a search response including the authentication token which is held by the holding unit and an electronic-mail address that is assigned to the printing device,
      a mail receiving unit configured to receive an electronic mail including an electronic file, and
      a printing unit configured to, in a case where the authentication token that the printing device has issued is included in the electronic mail received by the mail receiving unit, perform printing of the electronic file included in the received electronic mail.

2. The printing system according to claim 1, wherein the search request is transmitted using multicasting.

3. The printing system according to claim 1, wherein the printing device further includes a change unit configured to change, at predetermined time intervals, the authentication token that is held by the holding unit.

4. The printing system according to claim 3, wherein the printing device further includes a prevention unit configured to prevent the change unit from changing the authentication token in a case where a plurality of pieces of print data whose destination is the printing device are stored in a server.

5. The printing system according to claim 1, wherein the printing device further includes a print control unit configured to, in a case where the authentication token received by the mail receiving unit and the authentication token held by the holding unit do not match, perform printing in response to inputting of, from a user, an authentication token that matches the received authentication token.

6. The printing system according to claim 1, wherein the holding unit of the printing device is further configured to hold a plurality of authentication tokens having different periods of validity.

7. The printing system according to claim 1,
   wherein the printing system further comprises a server that manages the electronic mail transmitted from the terminal,
   wherein the printing device further includes
      a token transmitting unit configured to transmit, to the server, the authentication token that the printing device holds, and
   wherein the server includes
      a determining unit configured to determine whether the authentication token associated with the electronic file included in the electronic mail transmitted from the terminal and the authentication token transmitted from the printing device match, and decide, in accordance with a result of determination, whether the electronic file is to be transmitted to the printing device.

8. A printing device comprising:
   a holding unit configured to hold an authentication token;
   a search-request receiving unit configured to receive a search request to search for a printing device from a network;
   a search-response transmitting unit configured to transmit, in a case where the search request has been received by the search-request receiving unit, to a device that is a transmission source of the search request, a search response including the authentication token held by the holding unit and an electronic-mail address that is assigned to the printing device;
   a mail receiving unit configured to receive an electronic mail including an electronic file; and
   a printing unit configured to, in a case where the authentication token that the printing device has issued is included in the electronic mail received by the mail receiving unit, perform printing of the received electronic mail.

9. The printing device according to claim 8, wherein the search request is transmitted using multicasting.

10. The printing device according to claim 8, wherein the printing device further comprises a change unit configured to change, at predetermined time intervals, the authentication token that is held by the holding unit.

11. The printing device according to claim 10, wherein the printing device further comprises a prevention unit configured to prevent the change unit from changing the authentication token in a case where a plurality of pieces of print data whose destination is the printing device are stored in a server.

12. The printing device according to claim 8, wherein the printing device further comprises a print control unit configured to, in a case where the authentication token received by the mail receiving unit and the authentication token that the printing device holds do not match, perform printing in response to inputting of, from a user, an authentication token that matches the received authentication token.

13. The printing device according to claim 8, wherein the holding unit is further configured to hold a plurality of authentication tokens having different periods of validity.

* * * * *